US012560198B2

(12) United States Patent
Panas et al.

(10) Patent No.: US 12,560,198 B2
(45) Date of Patent: Feb. 24, 2026

(54) SYSTEM AND METHOD FOR MULTI-DOF CROSS-PIVOT FLEXURE BEARING WITH ENHANCED RANGE AND ENHANCED LOAD CAPACITY

(71) Applicants: Lawrence Livermore National Security, LLC, Livermore, CA (US); The Regents of the University of California, Oakland, CA (US); Bright Silicon Technologies, Inc., San Francisco, CA (US)

(72) Inventors: Robert Matthew Panas, Dublin, CA (US); Jonathan Hopkins, Los Angeles, CA (US); Robert McHenry, San Francisco, CA (US)

(73) Assignees: Lawrence Livermore National Security, LLC, Livermore, CA (US); The Regents of The University of California, Oakland, CA (US); Bright Silicon Technologies, Inc., San Francisco, CA (US)

( * ) Notice: Subject to any disclaimer, the term of this patent is extended or adjusted under 35 U.S.C. 154(b) by 971 days.

(21) Appl. No.: 16/953,039

(22) Filed: Nov. 19, 2020

(65) Prior Publication Data

US 2022/0154766 A1 May 19, 2022

(51) Int. Cl.
*F16C 11/12* (2006.01)

(52) U.S. Cl.
CPC .................................. *F16C 11/12* (2013.01)

(58) Field of Classification Search
CPC ...... F16C 11/12; Y10T 403/45; Y10T 403/54; Y10T 403/32041; Y10T 403/32049; Y10T 74/1293; G02B 7/1821; F16M 11/123

(Continued)

(56) References Cited

U.S. PATENT DOCUMENTS 2,627,733 A * 2/1953 Amberg .................... F16D 3/56
464/84
3,499,299 A * 3/1970 Nils ........................ F16D 3/005
464/81

(Continued)

FOREIGN PATENT DOCUMENTS

CN          207554560 U  *  6/2018
DE     102014006727 B3  *  10/2015  ............. F16C 11/12
WO    WO-2011138378 A1  *  11/2011  ............. B25J 17/00

OTHER PUBLICATIONS

Merriam, Ezekiel G., et al. "Compound Joints: Behavior and Benefits of Flexure Arrays." Precision Engineering, vol. 45, 2016, pp. 79-89. Crossref, doi:10.1016/j.precisioneng.2016.01.011.

(Continued)

*Primary Examiner* — Amber R Anderson
*Assistant Examiner* — Zachary A Hall
(74) *Attorney, Agent, or Firm* — HARNESS, DICKEY & PIERCE, P.L.C.

(57) ABSTRACT

The present disclosure relates to a cross-pivot flexure system. In one embodiment the system may incorporate a center post element having a first head at a first end thereof, and a second head at a second end thereof. The first head may be arranged along a first longitudinal axis and the second head may be arranged along a second longitudinal axis. The first head may be attached to an immovable ground element through at least one first cross-pivot element for enabling rotational movement about the first longitudinal axis, while the second head may be attached to a motion stage flexure via at least one second cross-pivot element. This construction permits rotational movement of the second head about the second rotational axis. The first and second longitudinal axes are further arranged so that they intersect one another.

18 Claims, 9 Drawing Sheets

(58) Field of Classification Search
USPC ........................................................ 403/119
See application file for complete search history.

(56) References Cited

U.S. PATENT DOCUMENTS

| | | | | |
|---|---|---|---|---|
| 3,548,613 A * | 12/1970 | Mounteer | ............... | F16D 3/005 |
| | | | | 464/81 |
| 4,060,315 A * | 11/1977 | Heinz | .................... | F16C 11/12 |
| | | | | 359/872 |
| 4,285,214 A * | 8/1981 | Bochan | ................... | F16D 3/005 |
| | | | | 464/119 |
| 4,692,050 A * | 9/1987 | Kaufman | ........... | F16M 11/2021 |
| | | | | 403/3 |
| 4,717,288 A * | 1/1988 | Finn | ...................... | E02B 17/027 |
| | | | | 403/291 |
| 5,392,662 A * | 2/1995 | Jadrich | ................... | F16H 25/24 |
| | | | | 403/220 |
| 5,529,277 A * | 6/1996 | Ostaszewski | ...... | F16M 11/2021 |
| | | | | 248/629 |
| 6,283,666 B1 * | 9/2001 | Genequand | ............. | F16C 11/12 |
| | | | | 439/492 |
| 7,451,950 B2 * | 11/2008 | Perez-Sanchez | ......... | B64C 9/02 |
| | | | | 16/225 |
| 8,871,338 B2 * | 10/2014 | Spadaccini | ........... | B81B 3/0081 |
| | | | | 428/134 |
| 8,881,520 B2 * | 11/2014 | Emigh | .................... | F16C 11/12 |
| | | | | 200/503 |
| 9,157,476 B2 * | 10/2015 | Panas | ..................... | F16C 11/12 |
| 9,212,691 B2 * | 12/2015 | Smith | ..................... | F16C 11/12 |
| 9,212,692 B2 * | 12/2015 | Baudasse | ............... | F16C 11/06 |
| 11,927,213 B2 * | 3/2024 | Hübner | ................... | F16C 11/12 |

OTHER PUBLICATIONS

Zhao Hongzhe and Bi Shusheng. "Stiffness and Stress Characteristics of the Generalized Cross-Spring Pivot." Mechanism and Machine Theory, vol. 45, No. 3, 2010, pp. 378-391. Crossref, doi:10.1016/j.mechmachtheory.2009.10.001.

Wu, Jianwei, et al. "A Generalized Analytical Compliance Model for Cartwheel Flexure Hinges." Review of Scientific Instruments, vol. 86, No. 10, 2015, p. 105003. Crossref, doi:10.1063/1.4934199.

Young, W. E. "An investigation of the cross-spring pivot." Journal of Applied Mechanics, vol. 11, No. 2 (1944): pp. 113-120.

Liu, Lang, et al. "Design and Experiment of Generalized Triple-Cross-Spring Flexure Pivots Applied to the Ultra-Precision Instruments." Review of Scientific Instruments, vol. 85, No. 10, 2014, p. 105102. Crossref, doi:10.1063/1.4897271.

Hongzhe, Zhao, and Bi Shusheng. "Accuracy Characteristics of the Generalized Cross-Spring Pivot." Mechanism and Machine Theory, vol. 45, No. 10, 2010, pp. 1434-1448. Crossref, doi:10.1016/j.mechmachtheory.2010.05.004.

Gonçalves Junior, L. A., et al. "Theoretical and Experimental Investigation of Performance Characteristics and Design Aspects of Cross-Spring Pivots." International Journal of Solids and Structures, vol. 185-186, 2020, pp. 240-256. Crossref, doi:10.1016/j.ijsolstr.2019.08.023.

Smelt, Koen J. et al. "Optomechanical Spherical Manipulator With an Adjustable Center of Rotation", Proceedings of the Annual Meeting of the American Society for Precision Engineering 3th Annual Meeting, Minneapolis, MN, Oct. 19-23, 2020, pp. 43-46.

Hopkins, J. B. "Designing hybrid flexure systems and elements using Freedom and Constraint Topologies", Mech. Sci, 4, 2013, pp. 319-331.

* cited by examiner

Fig. 1. a) A typical two-blade-element cross-pivot flexure system; b) the cross-pivot system deforming about its single degree of freedom (DOF) axis of rotation shown as a red line circumscribed by a red circular arrow.

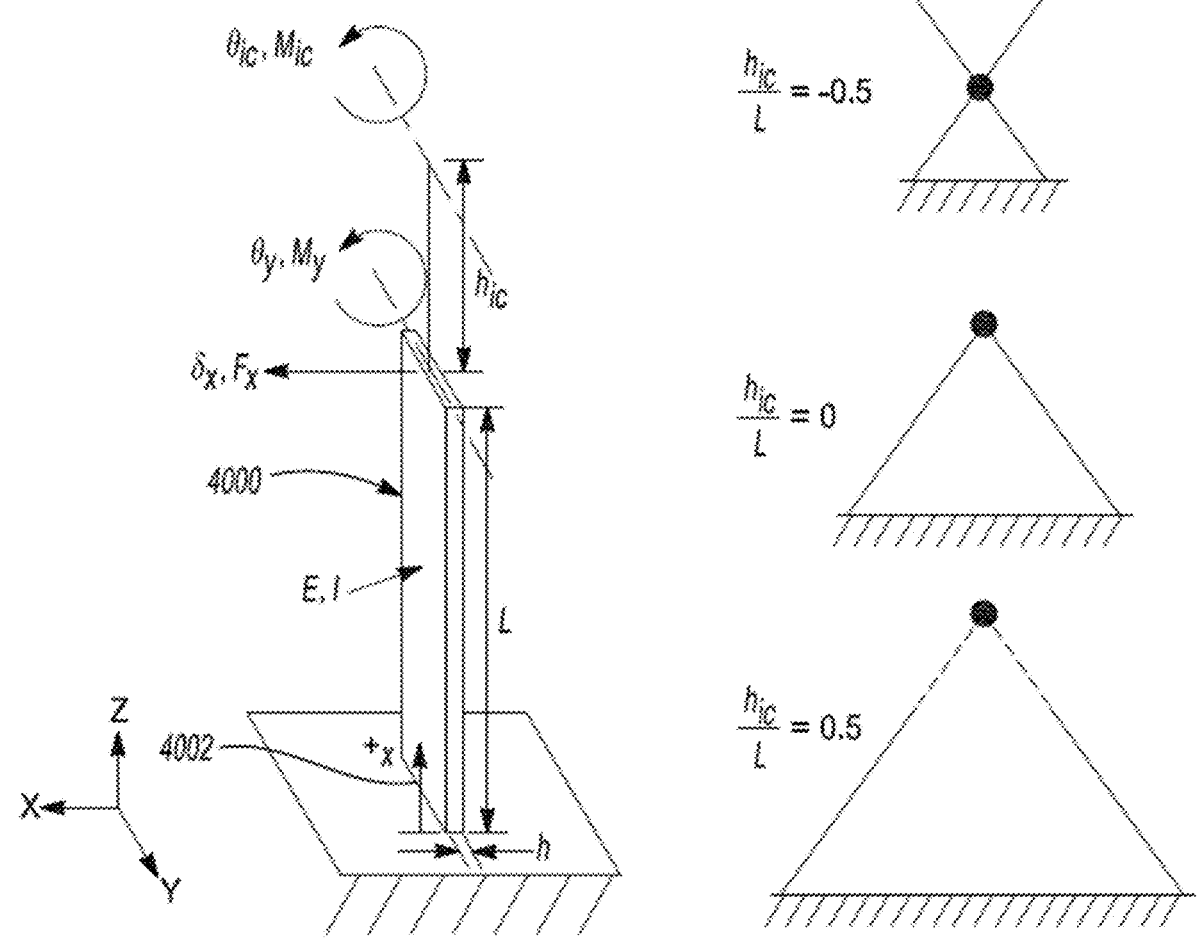
Layout of single flexure blade analysis including the location of the instant center
FIGURE 8a                    FIGURE 8b

SYSTEM AND METHOD FOR MULTI-DOF CROSS-PIVOT FLEXURE BEARING WITH ENHANCED RANGE AND ENHANCED LOAD CAPACITY

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to flexure systems, and more particularly to a monolithic flexure system having significantly increased load capacity for a given range of motion, and which can operate in more adverse environments than previously developed flexure bearings.

BACKGROUND

The statements in this section merely provide background information related to the present disclosure and may not constitute prior art.

Flexures are in common use for motion systems that must either achieve extreme precision, for example scientific instrumentation, integrated circuit fabrication equipment, or for motion systems that need to be able operate in harsh conditions, such as motion stages for aerospace optics applications. The lack of assembly or friction during operation makes it easy to achieve extremely high precision and fine motion with relatively simple bearing structures.

Flexure performance is often measured in their ability to guide desired motions over a range while resisting loading that tends to cause motion in undesired directions. Unfortunately, flexures tend to lose this stiffness to resist loading as they are adapted to deflect over larger ranges. They also tend towards lower buckling forces at larger displacements, meaning the flexure ceases to act as a clean motion guide in any way. This challenge of range versus load capacity is a difficult tradeoff to balance for optics that must be operated in harsh conditions. As flexures are lengthened and thinned to reach larger ranges of motion, such as guides for focus elements, then their buckling limits drop drastically.

SUMMARY

This section provides a general summary of the disclosure, and is not a comprehensive disclosure of its full scope or all of its features.

In one aspect the present disclosure relates to a cross-pivot flexure system. The system may comprise a center post element having a first head at a first end thereof, and a second head at a second end thereof. The first head may be arranged along a first longitudinal axis, and the second head may be arranged along a second longitudinal axis. The first head may be attached to an immovable ground element through at least one first cross-pivot element for enabling rotational movement about the first longitudinal axis. The second head may be attached to a motion stage flexure via at least one second cross-pivot element, permitting rotational movement of the second head about the second rotational axis.

In another aspect the present disclosure relates to a method for forming a cross pivot flexure system. The method may comprise coupling a first cross pivot flexure blade between a first head at a first area of a center post and a stationary component such that a first rotational axis extends through the first cross pivot flexure blade parallel thereto. The method may further include coupling a second cross pivot flexure blade to a second head at a second area of the center post and to a movable stage element, such that a second rotational axis extends through the second cross pivot flexure blade parallel thereto. The method may further include further orienting the second rotational axis non-parallel to the first rotational axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIGS. 8*a* and 8*b* illustrate a layout of a single flexure blade analysis including the location of the instant center;

DETAILED DESCRIPTION

Figures 1A, 1B, 2A, 2B, 3A, 3B, 3C:
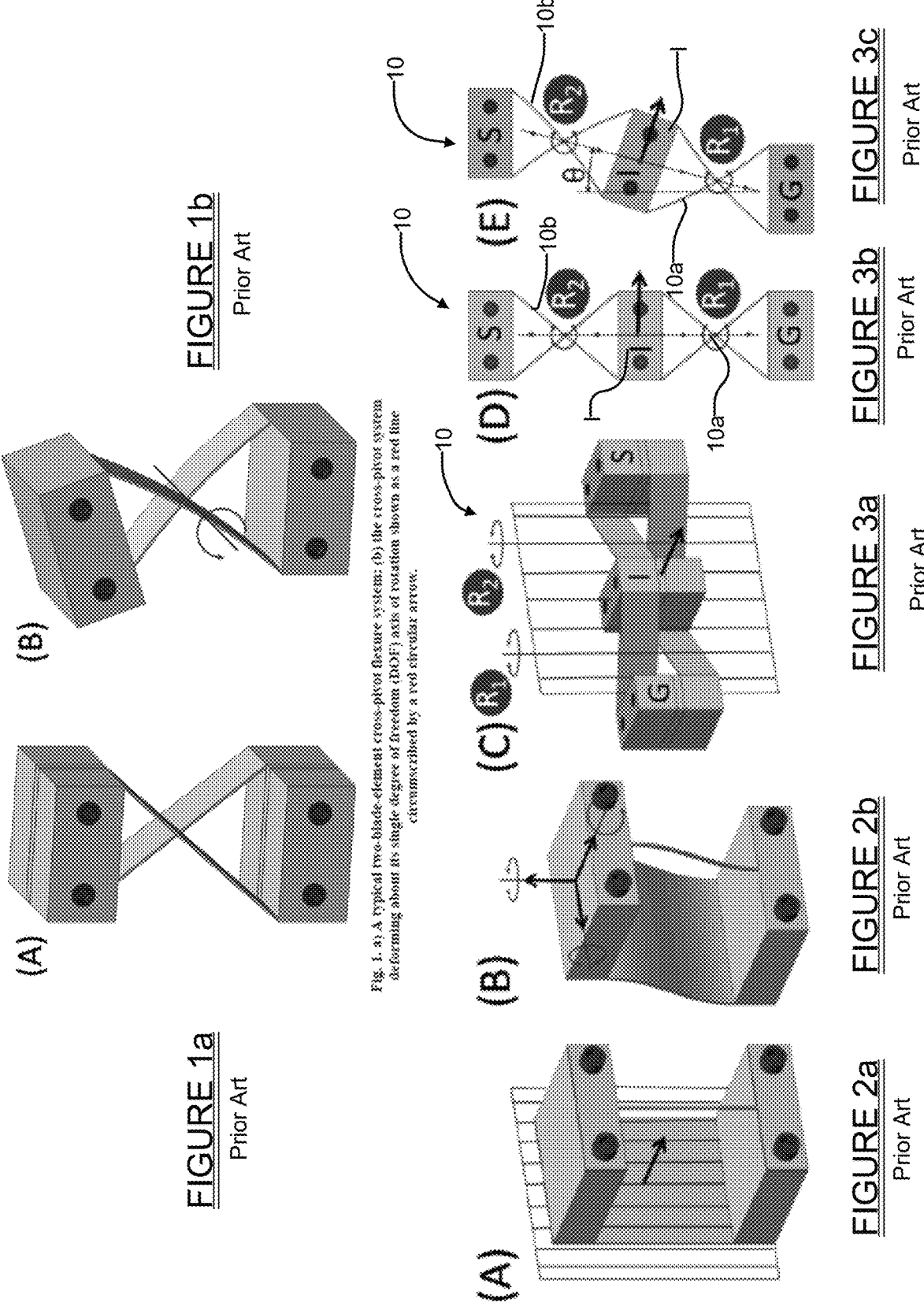
FIGS. 1a and 1b illustrate a prior art two blade cross-pivot flexure and how it may deform about a single degree of freedom (DOF)
FIGS. 2a and 2b illustrate a blade element and a wire arranged in parallel to help explain the freedom space of such a configuration, along with all the ways the system can deform with high compliance.
FIGS. 3a-3c illustrate high level, perspective views of one embodiment of a prior art flexure system in which two cross-pivot flexures have been connected in series to form a flexure system that is operatively equivalent to the system of FIG. 2a, while being significantly more stable over a much larger range of deformation.

Example embodiments will now be described more fully with reference to the accompanying drawings.

The co-inventors have invented systems and methods relating to a monolithic flexure bearing which has much higher load capacity than conventional flexure bearings for a given range of motion. This means flexure bearings that can withstand even greater load capacity, operate in more adverse environments with higher natural frequencies, provide even greater degree-of-constraint stiffnesses, and maintain more precise motion during regular operation. The monolithic flexures disclosed herein are also able to resist buckling to far higher levels than conventional flexure bearings meaning that the designs will retain operation, guiding along the desired motions, to much higher loads without catastrophic failure.

The present disclosure recognizes that flexure cross-pivots, while being a common design which is well known to show extreme performance in terms of range per size and load capacity per range, are nevertheless limited to only hinge-type operation. The present disclosure capitalizes on embodiments and methods that are able to create kinematic equivalents to conventional flexures from high-performance flexure cross-pivots. The kinematic equivalent embodiments disclosed herein are able to perform the same motion guidance as previously developed, standard flexure bearings, but in addition retain the extreme range and load capacity performance of the cross-pivot building blocks.

The present disclosure is broadly directed to a flexure bearing which includes cross-pivot flexures which can provide the same motion capability as standard flexures but with substantially improved load capacity and dynamics. Cross-pivot flexure-enabled designs thus allow systems to approach much closer to the ideal performance of rigid links with pin connections, with the net result that the flexure bearings can provide even higher precision, better dynamics and higher load capacity than previously developed flexure bearings.

Overview

The embodiments of the present disclosure replace a given flexure bearing with a cross-pivot synthesized kinematic equivalent. The various embodiments may be implemented, in one example, via four operations, summarized here and explained in greater detail below: 1) identify the freedom space of the bearing of interest, 2) extract the set of rotation lines that constrain this space, 3) insert a set of cross-pivot flexures with their rotational axes aligned to the rotation lines, with one or more cross-pivot flexures per rotation line, and 4) connect the cross-pivot flexures in series, parallel or in hybrid formations. This produces a cross-pivot-based kinematic equivalent to a given flexure, with the same motion constraint capabilities but with the capability to support larger ranges. The co-inventors produce the design for a compact, serial, cross-pivot flexure bearing which can provide multiple degree-of-freedom (DOF) rotation and thus enables a kinematic equivalent of the most common compliant building block, the wire flexure. The present disclosure demonstrates the capability of the process described above, and the abilities of the multi-DOF cross-pivot flexure bearings described herein to create the kinematic equivalent of a wire flexure. The multi-DOF cross-pivot flexure bearings described herein are new and unique, and essential for creating cross-pivot-based kinematic equivalents of common flexures like wires, from which virtually all other compliant structures can be assembled.

Detail

This section introduces the approach for synthesizing serially stacked cross-pivot flexures as kinematic equivalent systems to other general flexure systems. The approach is an extension of the freedom and constraint topologies ("FACT") synthesis approach. The FACT synthesis approach utilizes a comprehensive library of geometric shapes (see, e.g., Hopkins, J. B., 2013, "Designing Hybrid Flexure Systems and Elements Using Freedom and Constraint Topologies," *Mechanical Sciences*, 4: pp. 319-33, https://dspace.mit.edu/handle/1721.1/39879,) that represent the mathematics of screw theory. As explained in these document, one set of shapes, called freedom spaces, consists of "rotation" lines, "screw" lines, and "translation" arrows, which can all be modeled as twist vectors. Freedom spaces represent all the ways a system is permitted to move. Another set of complementary shapes, called constraint spaces, consist of pure force lines, wrench lines, and moment lines with circular arrows about their axes, which can all be modeled as wrench vectors. Constraint spaces represent the combinations of loads that a flexure system's flexible elements can impart on its rigid bodies to prevent them from moving with the motions that are not contained within the system's freedom space. Note that the freedom space shown in the example of prior art flexure system 10 of FIGS. 3*a*-3*c*, which make use of two pairs of cross pivot flexure blades 10*a* and 10*b* which series couple an intermediate element "I" between a stationary (e.g., Ground) element and a movable stage "S", forms a 2 DOF Type 2 freedom space.

The freedom spaces explained in the above-mentioned publications of Hopkins represent a library of all the combinations of motions that can be achieved using serially coupled cross-pivot flexures as described herein. Thus, any flexure system that achieves any of the freedom spaces illustrated in Hopkins can be improved by replacing it with serially stacked cross-pivot flexures as described herein. The reason is that the freedom spaces shown in the Hopkins publications possess as many independent twist vectors that are red rotation lines as there are independent twist vectors (i.e., DOFs) in the entire space.

The first step of the synthesis approach to convert a flexure system into a kinematically equivalent version that consists of serial stacked cross-pivot flexures is thus to recognize whether the original flexure system possesses a compatible freedom space. If the freedom space of the original flexure does lie within the compatible freedom space, designers can proceed to the second step. The compatible freedom spaces which can be reproduced via serial cross-pivot kinematic equivalents is: 1 DOF Type 1, 2 DOF Types 1-3, 3 DOF Types 1-9, 4 DOF Types 1-9, 5 DOF Types 1-3, 6 DOF Type 1. The second step of the approach is to select specific rotation lines from within the defined freedom space. The twist vectors that mathematically model the selected rotation lines should be independent and the number of red rotation lines that should be selected is the number of independent twist vectors or DOFs within the entire space. The details of how to select rotation lines such that they are independent is provided in previous publications cited above. Once these rotation lines have been selected, designers can proceed to the third step.

The third and final step is to align the rotational axes of cross-pivot flexures with the rotation lines selected from the second step. The rigid bodies of each cross-pivot flexure should be connected as a serial chain. The resulting system will be able to stably deform with the motions represented by its freedom space without acquiring any additional DOFs as it deforms. If the cross-pivot flexures are chosen so that they are nested in the same volume, compact systems that stably deform large ranges can be produced.

Figures 4A, 4B, 4C, 4D, 4E, 4F, 4G, 4H:
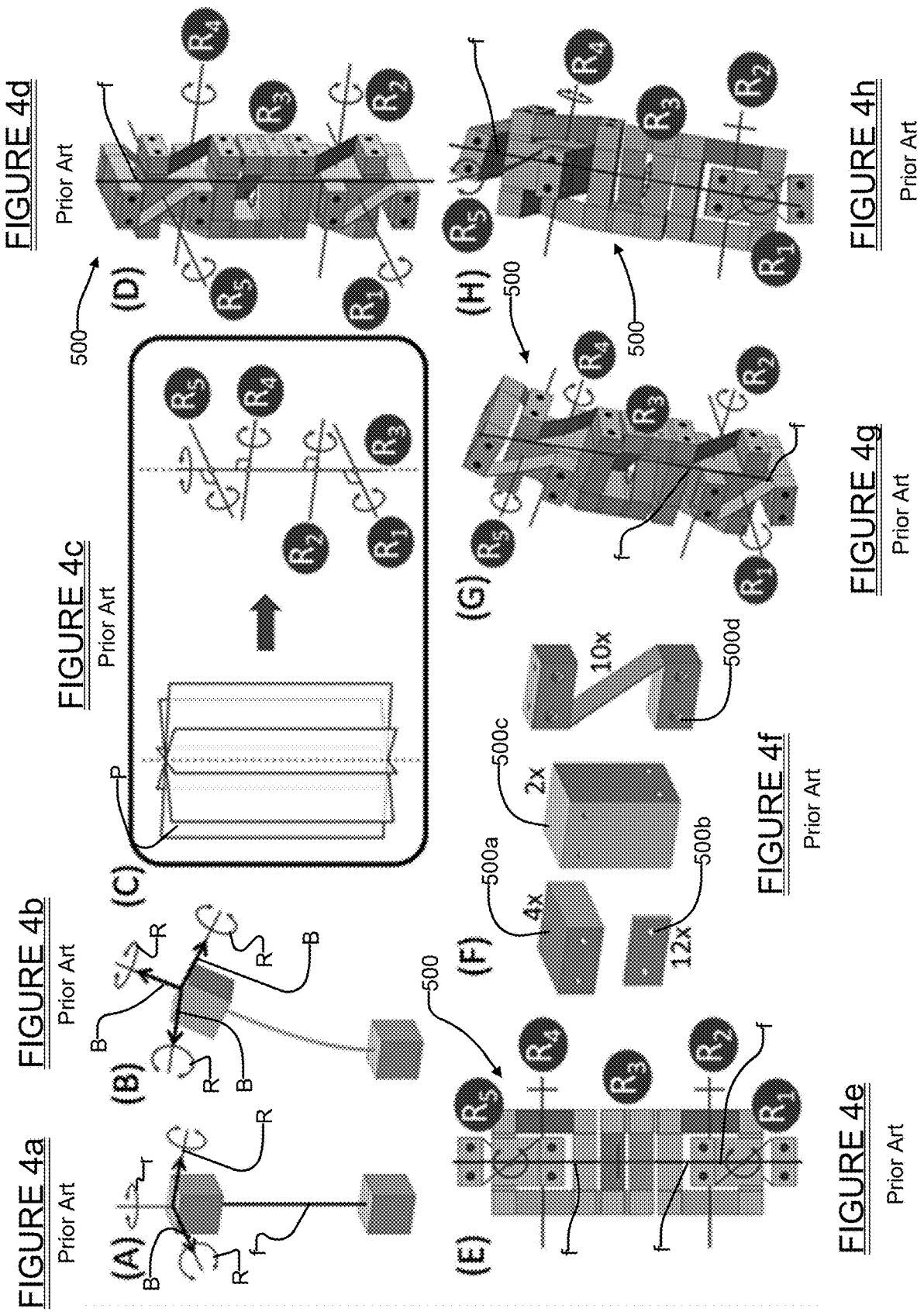
FIG. 4a is a prior art perspective drawing of a wire element that shows its degrees of freedom (DOF)
FIG. 4b is a prior art perspective drawing of the wire element of FIG. 4a showing how the wire element loses its ability to constrain motions along its axis when it is deformed.
FIG. 4c is a prior art illustration which shows how five independent rotation lines ("r") are selected from the wire element's freedom space.
FIGS. 4d and 4e are prior art illustrations which show how the rotational axes of five series connected cross-pivot flexures are aligned with the five rotation lines selected, and that the five rotational axes do not necessarily have to intersect with each other, but rather all only need to intersect with the vertical axis labelled "f" in the figure that runs longitudinally through all of the five flexures.
FIG. 4f is a prior art illustration which shows how multiple copies of four unique parts can be assembled to make the resulting system.
FIGS. 4g and 4h are prior art illustrations which show how as the system is deformed by large amounts, it behaves like a wire element that changes its location and orientation but never loses its ability to constrain deformation along its axis.

As one example, consider a need to synthesize the cross-pivot kinematic equivalent of a wire element like the kind shown in FIG. 4a. Wire elements are among the most commonly used elements within precision flexure systems. Wire elements constrain their rigid bodies along their axes and are modeled using single pure force lines "f" as shown in FIG. 4a. Consequently, wire elements achieve five DOFs (three rotations and two translations as shown by the lines denoted with an "R", and two arrows labelled "B" in FIG. 4a respectively). When, however, wire elements deform (FIG. 4b) they are no longer able to constrain bodies along their axes and thus they exhibit six DOFs (as indicated by rotations "R" and translations "B" in FIG. 4b). Thus, any system that uses wires becomes kinematically unstable over large ranges of deformation.

If one applies the synthesis approach previously introduced, a new cross-pivot flexure kinematic equivalent can be generated. The first step of the approach is to recognize that a wire element's freedom space is the 5 DOF Type 1 freedom space. Such a space is shown, for example, in FIG. 5 of Hopkins, J. B., "*Hybrid Flexure Synthesis Using Freedom and Constraint Topologies*", Mechanical Sciences, 4: pp. 319, 33, which is incorporated by reference herein. Since this freedom space lies within the shaded red boxes of FIG. 5 of Hopkins, referenced above, it is possible to synthesize a cross-pivot flexure kinematic equivalent. The second step of the approach is to select five rotation lines "R" that are independent from within the portion of the freedom space. The planes "P" defined in FIG. 4c define the freedom space and form an infinite number of infinitely large planes of rotation lines R that all intersect the axis of the wire element f. One way to select five rotation lines R from within this space such that they are independent is shown in FIG.

4c, where each rotation line R is labeled R1 through R5. The third step of the approach is to align the rotational axes of cross-pivot flexures with the five rotation lines R selected from the second step. One possible compact topology that satisfies this condition is shown by a flexure system 500 in FIGS. 4d-4e. The flexure system 500 of FIGS. 4d-4e may be fabricated by assembling multiple copies of the four unique parts 500a, 500b, 500c and 500d shown in FIG. 4f. In FIG. 4f, four ones of part 500a, twelve ones of part 500b, two ones of part 500c and ten ones of part 500d are used to construct the flexure system 500. Note that regardless of how much the flexure system 500 is deformed, it will always exhibit the desired freedom space of a common wire element without accruing additional unwanted DOFs, just as if the wire element (FIG. 4a) never deformed but only displaced and changed its orientation. This desired freedom of space of the flexure system 500 is shown in FIGS. 4g-4h.

Figures 5A, 5B, 5C:
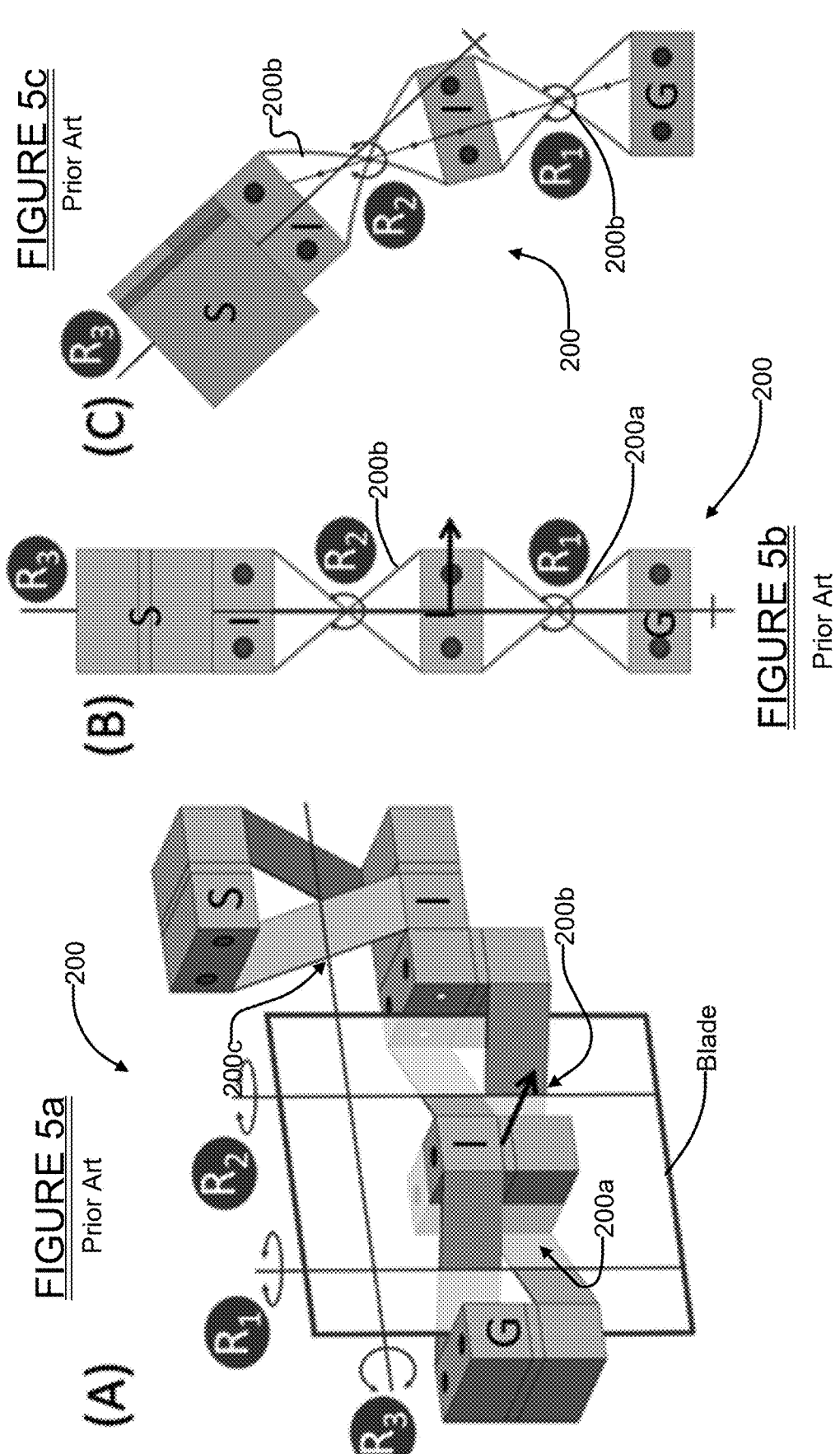
FIGS. 5a-5c show examples of prior art flexure systems to further help illustrate how two series coupled cross-pivot flexures can be configured to mimic flexing movement of a blade (i.e., about axes R1 and R2)

It is important to note that although all of the kinematic equivalent cross-pivot flexure designs generated using the approach described herein will never accrue extra DOFs as they become deformed, they may not always maintain the same freedom space over all of the design's deformation configurations. Consider the three DOF example shown in the cross pivot flexure system 200 of FIG. 5a. Since all three rotation lines achieved by each constituent cross-pivot flexures 200a, 200b and 200c, labeled R1 through R3 in FIG. 5a-b, lie on the same plane before the system is deformed, the freedom space of the system is the infinite plane of rotation lines (i.e., as shown as 3 DOF Type 1 in Hopkins, referenced above). If the system 200 is deformed a large amount as shown in FIG. 5c herein, although it remains kinematically stable with the same initial number of DOFs (i.e., three), its freedom space changes from 3 DOF Type 1 to 3 DOF Type 4.

There are other even rarer examples where a serially stacked cross-pivot flexure system of the present disclosure may even be deformed into a singular configuration that causes the flexure system to not only change its freedom space, but to change its freedom space to a space constituted by a smaller combination of DOFs. An example would be a series of three cross-pivot flexures with parallel rotational axes that do not initially lie on the same plane, but after they are deformed all three rotational axes do align on a common plane. In this case, the flexure system's freedom space would change from 3 DOF Type 2 in FIG. 3 to 2 DOF Type 2. In no cases, however, would any serially stacked cross-pivot flexure system constructed in accordance with the present disclosure lose kinematic stability and accrue extra unwanted DOFs like most other prior art flexure systems.

Synthesizing Serially Stacked Cross-Pivot Flexures that are Arranged in Parallel Whereas only the freedom spaces shown in the shaded red boxes of FIG. 5 in Hopkins, J. B., 2013, "Designing Hybrid Flexure Systems and Elements Using Freedom and Constraint Topologies," *Mechanical Sciences,* 4: pp. 319-33 can be achieved by stacking cross-pivot flexure building blocks in series using the synthesis theory described previously, every possible combination of DOFs (i.e., every freedom space) can be achieved if such serially stacked limbs are also allowed to be arranged in parallel. This section introduces the general theory for synthesizing such hybrid configurations.

The first step of the approach is to identify the desired freedom space that represents the desired DOFs of the final system. Once that freedom space has been identified within the library of FIG. 5 in Hopkins, J. B., 2013, "Designing Hybrid Flexure Systems and Elements Using Freedom and Constraint Topologies," *Mechanical Sciences,* 4: pp. 319-33, that library provides the system's constraint space.

The second step of the approach is to divide that constraint space into selected limb constraint spaces according to the principles detailed in Hopkins, J. B. Designing hybrid flexure systems and elements using Freedom and Constraint Topologies. Mech Sci 2013; 4:319-31. https://doi.org/10.5194/ms-4-319-2013. Each of these limb constraint spaces will correspond to the constraint space of its corresponding serially stacked cross-pivot flexure limb. Thus, in addition to the conditions specified in Hopkins, J. B. Designing hybrid flexure systems and elements using Freedom and Constraint Topologies. Mech Sci 2013; 4:319-31. https://doi.org/10.5194/ms-4-319-2013, the limb constraint spaces selected must lie within the shaded red boxes of FIG. 5 in Hopkins, J. B., 2013, "Designing Hybrid Flexure Systems and Elements Using Freedom and Constraint Topologies," *Mechanical Sciences,* 4: pp. 319-33 because only those constraint spaces possess freedom spaces that can be used to synthesize serially stacked cross-pivot-flexure building blocks.

The third and final step of the approach is to then use the complementary freedom spaces of the limb constraint spaces selected in the second step of the approach to synthesize limbs consisting of serially stacked cross-pivot-flexure building blocks according to the approach detailed previously. The resulting system will consist of serially stacked cross-pivot-flexure limbs arrange in parallel.

Cross-pivots operate around the lower theoretical limit of strain stiffness, enabling large ranges of motion in compact systems. Cross-pivots can achieve the highest possible range of motion for a given blade aspect ratio of bending thickness over length, as will be shown in the strain stiffness section below. This blade aspect ratio determines the DOC behavior of the cross-pivot element, including the axial stiffness and buckling load. The system structural dynamics are generally also linked to the DOC stiffness, so in all these cases a cross-pivot element-based design provides a means to improve performance up to near theoretical limits given a required range of motion. Kinematic equivalents synthesized from cross-pivot element of common elements such as wire flexures also provide extra design parameters so that designers can access an increased range of DOF stiffnesses for a given range of motion, and decouple the stiffness of different axes of rotation via the 2 DOF and 3 DOF cross-pivot designs described in the next section.

2D and 3D Flexure Cross-Pivots—Primary Topology

Figures 6A, 6B:
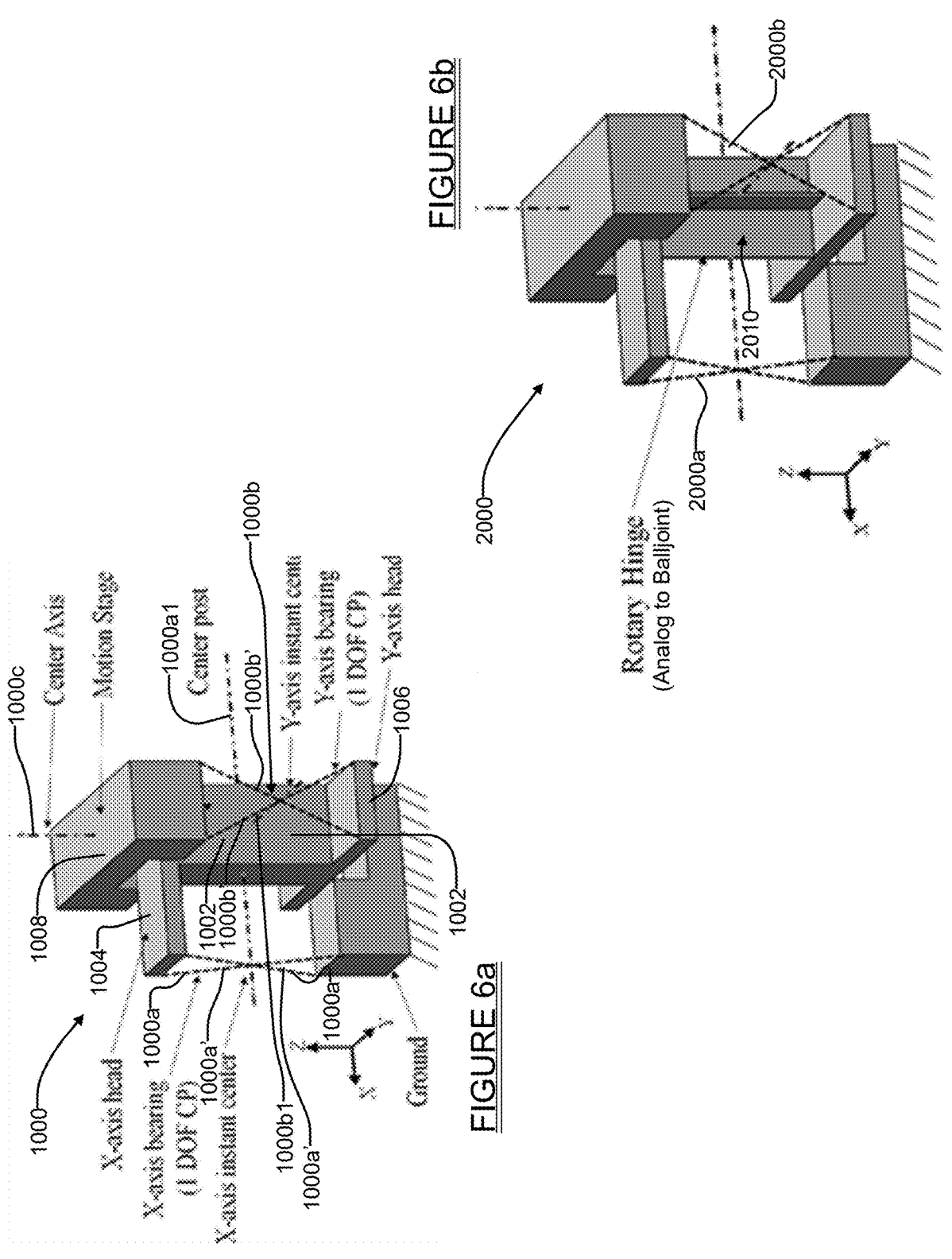
FIG. 6*a* shows one embodiment of a flexure system in accordance with the present disclosure, using two 1 DOF cross-pivot flexures in series, which forms a 2DOF cross-pivot flexure design.
FIG. 6*b* is another embodiment of the flexure system of the present disclosure which shows a 3DOF cross-pivot flexure design combining two 1DOF cross-pivot flexures in series, rotated and folded on one another.

Conventional designs with flexure cross-pivots have focused on a hinge providing a single axis of rotation (e.g., 1DOF cross-pivot, as shown in previous work on this topic). The present disclosure describes embodiments of cross-pivot flexure systems which illustrate how multiple 1DOF cross-pivot elements can be combined to create a multi-DOF cross-pivot flexure system bearing, where the instant centers can intersect (but do not necessarily have to) with either 2DOF or 3DOF of rotation. In one example, a cross-pivot flexure system 1000 is shown in FIG. 6*a*. The flexure system 1000 is achieved by stacking two 1DOF cross-pivot flexures 1000*a* and 1000*b* in series, rotated 90 degrees to one another, and folded back on one another as shown in FIG. 6*a*. The 1DOF cross-pivot flexures 1000*a* and 1000*b* each have pairs of flexure blade elements 1000*a'* and 1000*b'* which are represented with dashed lines in FIG. 6*a*. Thus, the flexure system 1000 illustrates one example for a layout of the flexure blades 1000*a'* and 1000*b'* and their locations, as well as the orientations of their associated instant centers, labelled as 1000*a*1 and 1000*b*1, respectively.

The patterning of the 1DOF cross-pivot flexures 1000*a* and 1000*b* around an elongated longitudinal axis 1000*c* at an axial center of the center post 1002 enables each rotation axis 1000*a*1 and 1000*b*1 to undergo large displacements without interference. The center post 1002, while shown having a generally rectangular cross-sectional shape in FIG. 6*a*, may have any shape that ensures that the head elements 1004 and 1006 are rigidly connected. While many possible topologies for a multi-axis rotary hinge are possible, the flexure system 1000 is especially desirable due to its compact, large displacement compatible, symmetric and instant-center intersecting layout. Some flexure designs may have instant centers which intersect (examples of FIGS. 6*a* and 6*b*) or not intersect (examples of FIGS. 4*d*-4*h*) while still retaining kinematic stability and the ability to act as 2DOF or 3DOF cross-pivot flexures. FIG. 6*b* shows another embodiment 2000 of a flexure system of the present disclosure that also makes use of two cross-pivot flexures 2000*a* and 2000*b*, in a similarly compact layout, but with the center post 2010 replaced with a rotational bearing.

The intersecting instant centers of the flexure systems 1000 and 2000 provide an analog to ball-and-socket bearings (i.e., operation like a balljoint) with easily modeled kinematics. Non-intersecting instant center systems exhibit kinematics that are more complex than a simple hinge and thus may be not be preferred for certain applications.

In FIG. 6*a*, the x-axis rotation is generated by the x-axis 1DOF cross-pivot flexure 1000*a* on the x-axis facing sides of the center post 1002. Although only one of the two x-axis facing sides is shown with flexures, a best practice may be to distribute the flexures composing the x-axis 1DOF cross-pivot flexure symmetrically around the center post 1002 (i.e., on the left and right sides of the center post 1002). All of the x-axis flexures 1000*a* may be linked by an x-axis head element 1004. The center post 1002 links to the x-axis head 1004 at the top and to a y-axis head 1006 at the bottom, where the two heads are rotated 90° to one another. The y-axis rotation is generated by the y-axis 1DOF cross-pivot flexure 1000*b* on the y-axis facing sides of the center post 1002. A symmetric distribution of a plurality of flexures 1000*b* may again be used here with the flexure system 1000 as with the x-axis 1DOF cross-pivot flexure. The y-axis 1DOF cross-pivot flexure 1000*b* links from the y-axis head 1006 to a motion stage 1008. The center post 1002 can either be rigid, thus limiting the hinge to 2DOF (x, y), or can be replaced with a torsional hinge such as a cruciform 2010 for the flexure system 2000, or a cage hinge, which allows for z motion, and thus enables the hinge flexure system 2000 of FIG. 6*b* to achieve 3DOF (x, y, z) without changing the overall hinge system size (note the overall dimensions of the two flexure systems 1000 and 2000 are the same). Alternately, the third DOF of θz motion can be achieved with a cross-pivot flexure above the 2DOF cross-pivot flexure system 1000 or 2000, as illustrated by in FIGS. 4*d*-4*h*. The double cross-pivot designs with a torsion bearing standing in for the center post as shown in FIG. 6*b* provide the 3rd DOF without changing the bearing overall size, but the torsional bearings will have less range than cross-pivot based bearings. This may be acceptable in many applications. The triple cross-pivot flexure system embodiments in FIGS. 4*d*-4*h* each increase the 3DOF bearing overall size but enables large range z-axis motion, on a similar range to the x- and y-axis motion range. The range and stiffness of the x-axis, y-axis, and z-axis cross-blade bearings can be customized to the needs for each axis.

Figure 6C:
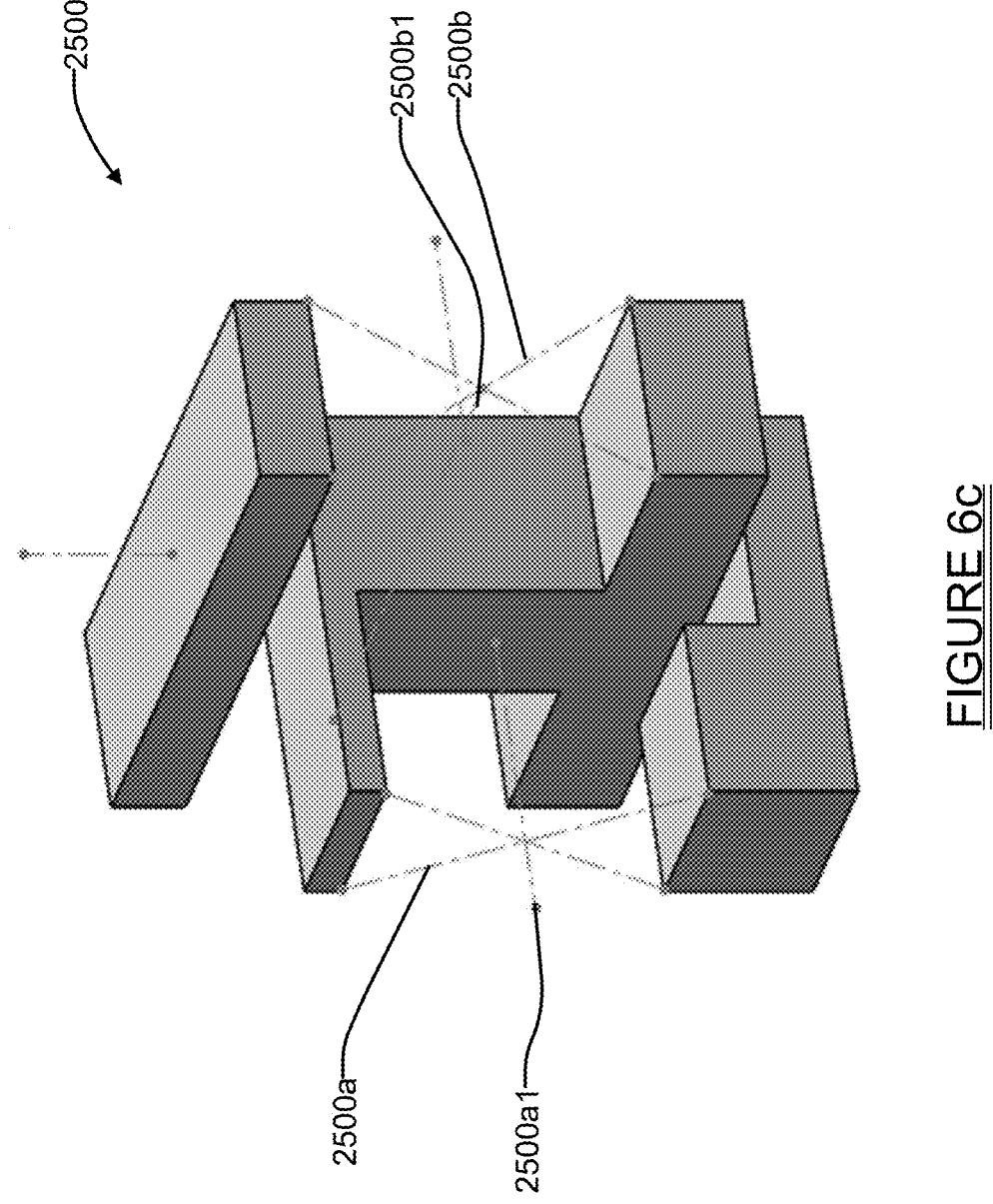
FIG. 6*c* is another embodiment of a flexure system in accordance with the present disclosure which illustrates how the instant centers of two flexures need not be intersecting.

FIG. 6*c* shows a flexure system 2500 in accordance with another embodiment of the present disclosure to illustrate a rotary hinge embodiment where the instant centers of flex-ures 2500a and 2500b do not intersect, as indicated by axes 2500a1 and 2500b1.

Figures 7A, 7B, 7C, 7D, 7E:
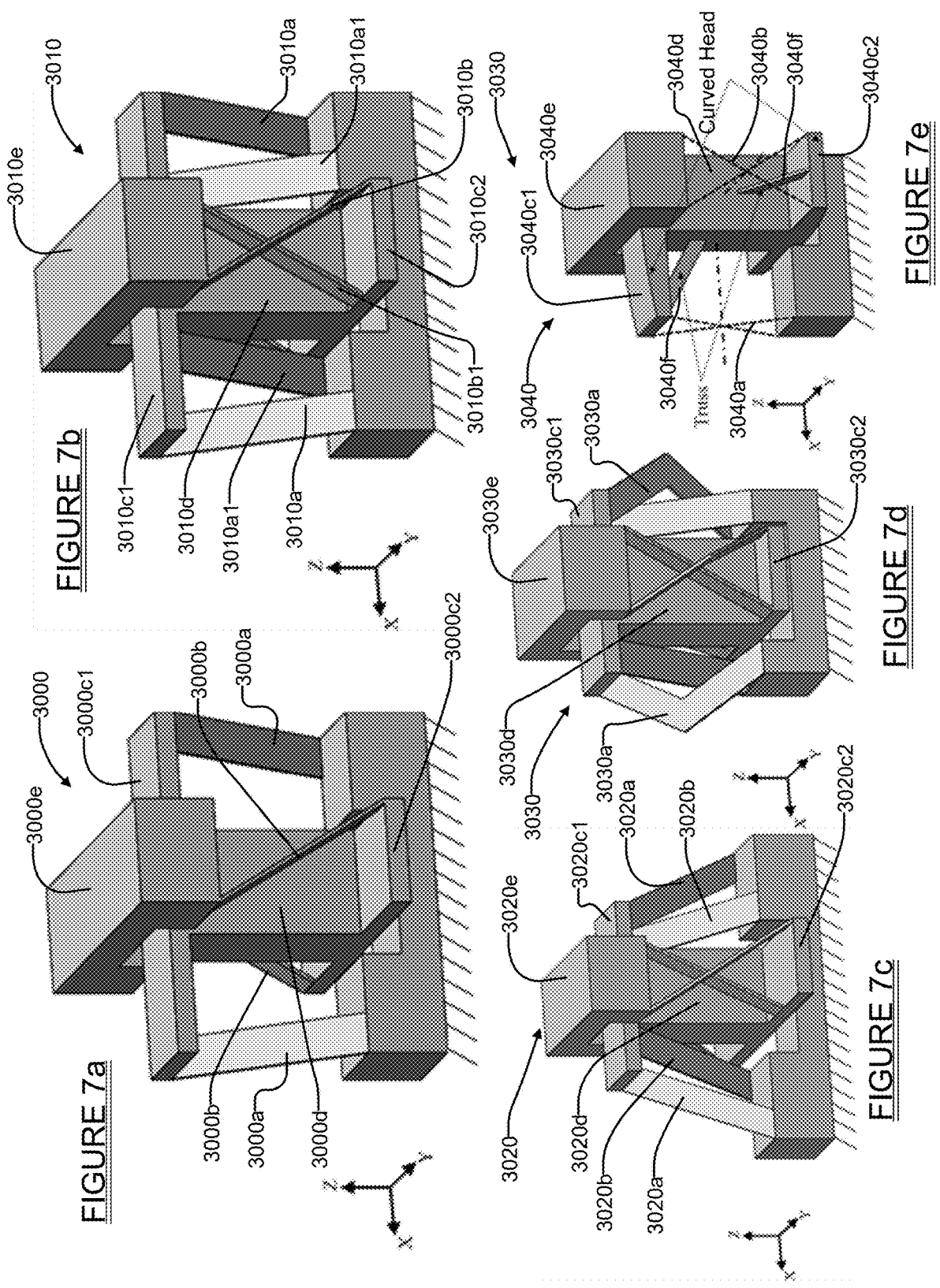
FIGS. 7*a*-7*e* illustrate various differing embodiments of a flexure system in accordance with the present disclosure which provide a multi-DOF bearing, with a minimum number of blade elements (FIG. 7*a*), a screw compression stabilized design (FIG. 7*b*), an angled blade design (FIG. 7*c*), a bend blade design (FIG. 7*d*), and a design including trusses and curved heads on a 3DOF configuration (FIG. 7*e*)
Figures 9A, 9B, 9C, 9D:
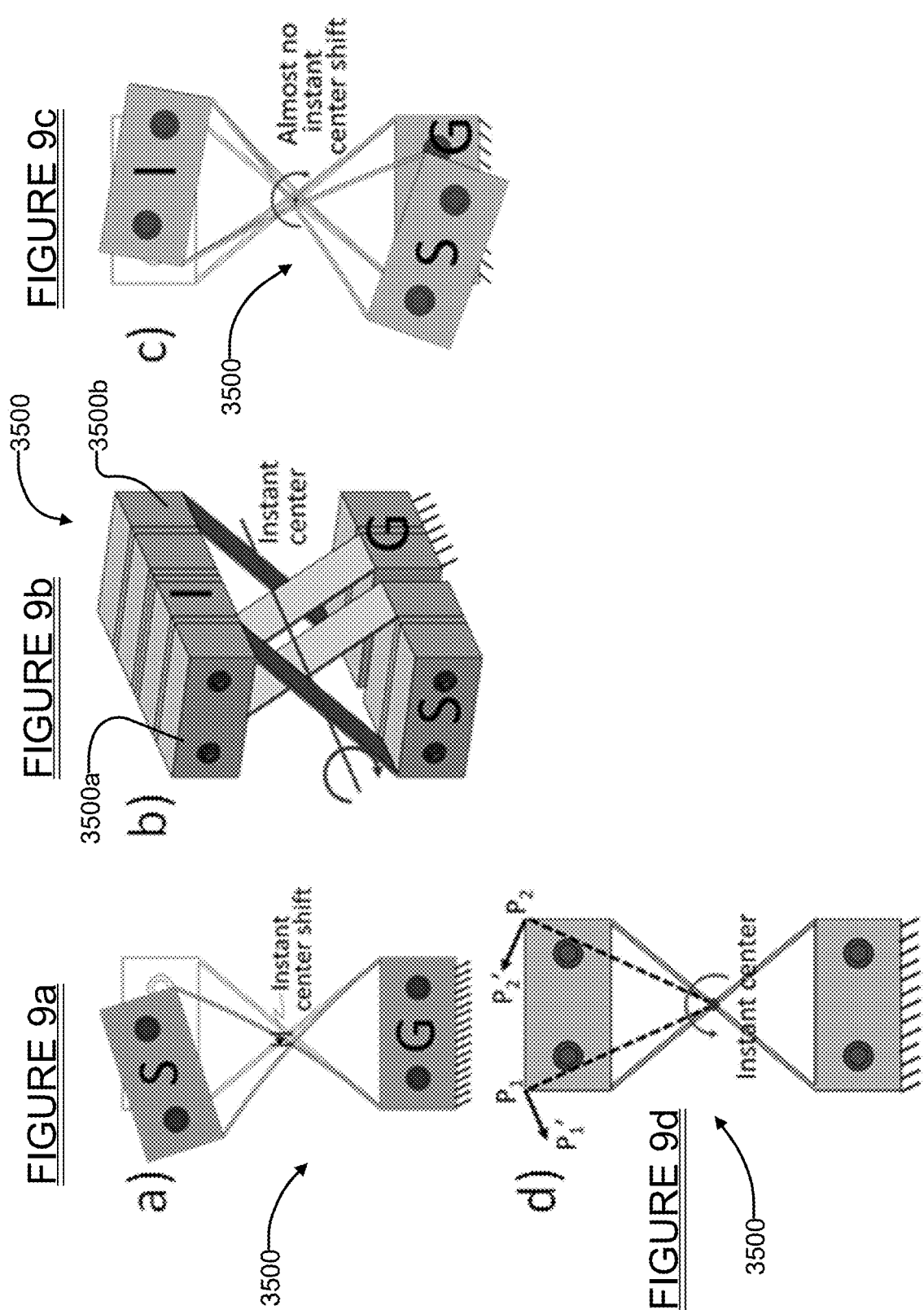
FIGS. 9*a*-9*d* show another embodiment of a flexure in accordance with the present disclosure in which the instant center of a single cross-pivot flexure shifts as it rotates (FIG. 9*a*), which causes a rotational parasitic error (FIG. 9*b*), and where the double cross-pivot flexure design (FIG. 9*c*) dramatically reduces this error; and an approach (FIG. 9*d*) for calculating instant center locations as the stage rotates.
Figure 9E:
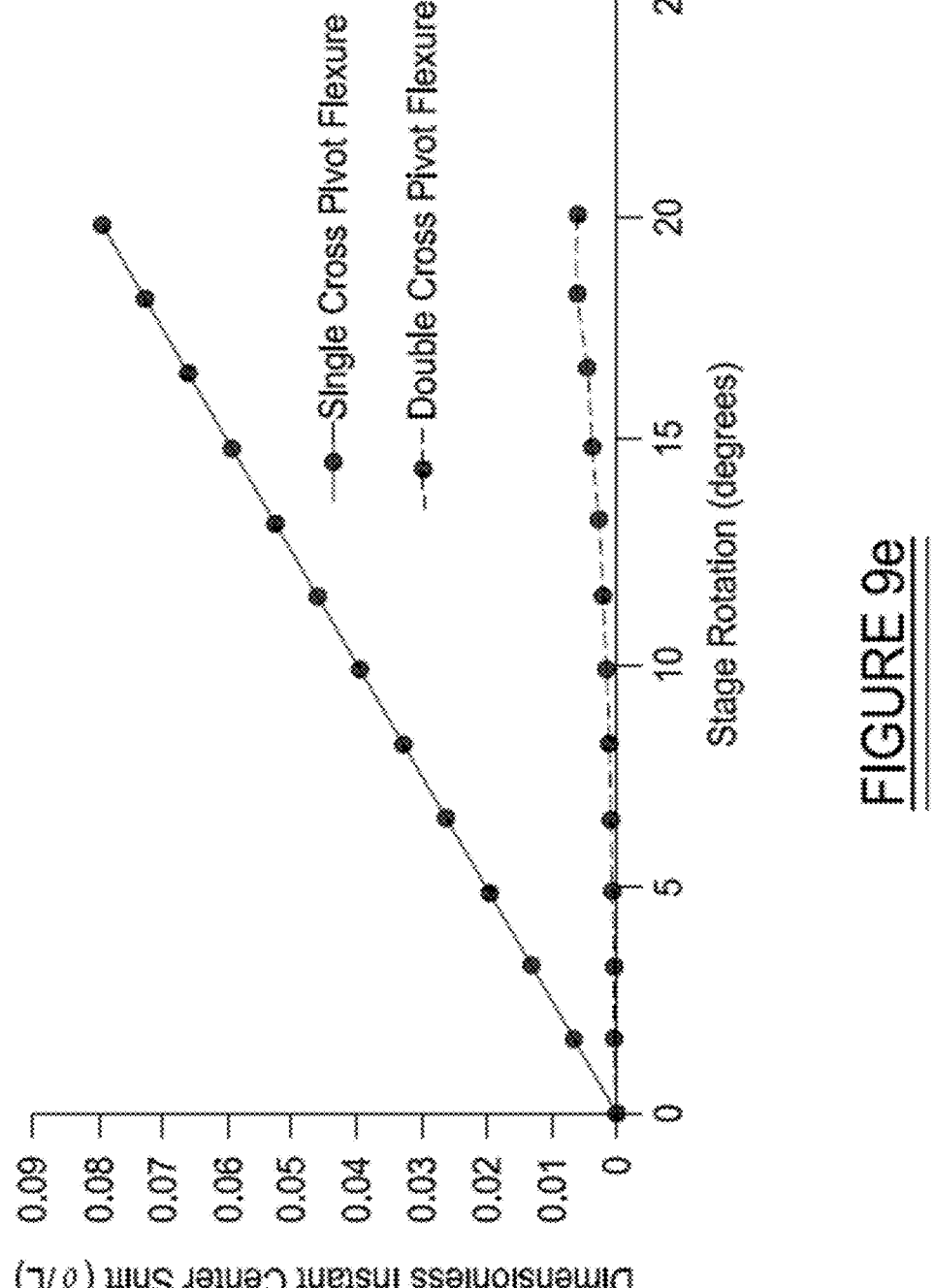
FIG. 9*e* shows a graph illustrating how the dimensionless instant center shift of both the single and double cross-pivot flexure designs of FIGS. 9*a*-9*d* can be plotted and compared.

Several options are available to the designer while retaining some level of symmetry for the x- and y-axis 1DOF cross-pivot flexures. A single flexure blade can be placed on either side of the central post in a rotationally symmetric orientation, so together they form the 1DOF cross-pivot flexure, as shown with flexure system 3000 in FIG. 7a, representing a minimal design having a pair of flexure blades 3000a associated with the x-axis and a pair of flexure blades 3000b associated with the y-axis. The minimal design of the flexure system 3000 leaves open a screw motion DOF under high axial loading. A screw compression compensated design, such as flexure system 3010, incorporates a countering set of blades 3010a1 and 3010b1 on each side as shown with the flexure system 3010 in FIG. 7b. Rotational counter-motion rather than mirror symmetry is used for these designs to avoid leaving the head structures 3000c1 and 3000c2 susceptible to bowing. Designs incorporating more than two blades on either side have shown no clear advantage. The summed blade width, for example the summed width of each blade pair 3000a/3000a1 and 3000b/3000b1 for each 1DOF cross-pivot flexure is an easily adjustable parameter to set the rotational stiffness without altering range. There is diminishing benefit to create blades whose widths are far larger than the width of the center post 3000d with regards to degree-of constraint stiffness. Preferably, it is likely that each blade should be only up to the width of the center post 3000d. When this constraint is violated, the assumption of torsional rigidity for the center post 3000d fails, as would the assumption of rigidity of the heads 3000c unless significant amounts of mass are used for the heads.

The flexure blades composing the x- and y-axis 1DOF cross-pivot flexures 3000, 3010, 3020, 3030 and 3040 of FIGS. 7a-7e, respectively, can be laid out in several symmetric ways. FIG. 7b shows the flexure system 3010 including parallel pairs of blade elements 3000a/3000a1. FIG. 7c shows the flexure system 3020 with angled pairs of blade elements 3020a and 3020b. FIG. 7d shows the flexure system 3030 with bent blade elements 3030a. The parallel arrangement of blade elements is the simplest and has the two flexures on each side aligned vertically, which enables the flexures to see nearly the same strain loading and provide the highest degree of symmetry.

One common requirement on the design of the multi-DOF rotary hinge is to limit the cross section of the entire hinge at certain interfaces. This can be enabled by the angled approach of FIG. 7c, as the multiple blades 3020a/3020b for each 1DOF cross-pivot flexure only increase the hinge width by the equivalent of a single blade. The outer blade (i.e, blade element 3020a) is angled to have the same distance from the center post 3020d on one side, but then must be much further out on the other side. The angled blade 3020a may show a few percent increase in strain stiffness at high angles. The major downside to the angled blade flexure system 3020 design of FIG. 7c is the cross-section of the non-minimized side (i.e., the cross section through all four blade elements 3020a and 3020b). This configuration can be further adjusted by bending each of the angled blades 3020a, so that each starts angled at one angle and ends at a different angle, as shown for the flexure system 3030 in FIG. 7d. The bent blade approach used with the flexure system 3030 (FIG. 7d) thus allows for reduced cross sections at both ends. A symmetric setup with the bent blade structured like a sideways V produces the minimum possible cross section on both sides of the flexure system 3030. The bend in the blade element 3030a acts as a local strain multiplier (the inner side of the bend) that raises the strain stiffness for the whole blade, rising with the angle of bending. A fillet on the inside of the bend element 3030a (i.e., the side closest to the center post 3030d) will reduce the notch factor to 1.3 for the approximate aspect ratios shown in FIGS. 7a-7d.

With brief reference to FIGS. 9a-9e, large ranges of motion can be achieved by replacing a single cross-pivot bearing with two (or more) identical cross-pivot flexures in series such that their instant centers align. The repeat elements can be used in the multi-axis cross pivot design described previously. The redundant cross pivot flexure not only scales range by the number of cross-pivot flexures but it also reduces the parasitic error of rotation in the case of a set of two, because as the stage of the design, labeled S in FIGS. 9a-9e, rotates, the intermediate body, labeled I, rotates in the opposite direction. Thus, the instant centers of the two sets of cross-pivot flexures 3500a and 3500b in FIG. 9b, for example, will shift in approximate opposite directions with similar magnitudes, thereby cancelling out the majority of the shifting of the instant centers, which significantly reduces the parasitic error. By connecting two cross-pivot flexures 3500a and 3500b in series, the operation range is doubled as well. It is also worth noting, however, that while the double cross-pivot design greatly reduces parasitic error, it also introduces a redundant rotational DOF on the intermediate stage between the two serially connected cross-pivots. The redundant DOF will cause the system to be under-constrained and may lead to undesirable vibrations. If the under-constrained DOF is of a major concern, an under-constraint eliminator as detailed in Panas R M, Hopkins J. B. Eliminating Under constraint in Double Parallelogram Flexure Mechanisms. J Mech Des Trans ASME 2015; 137. https://doi.org/10.1115/1.4030773, may be incorporated in the system.

Secondary Topology

The interface between the central post (e.g., center post 3000d-3040d in FIGS. 7a-7d) and heads 3000e-3030e in the multi-DOF rotary hinge flexure system of FIGS. 7a-7d present the most pressing issues with regards to maintaining high axial stiffness. This is because the heads 3000d-3030d are cantilevered, potentially to a large degree if the 1DOF cross-pivot flexure blades have significant width. A truss between the end of the head and the side of the central post can substantially raise the axial stiffness as shown in FIG. 7e. The flexure system 3040 of FIG. 7e includes a pair of such trusses 3040f which pass between the blades 3040a and 3040b (shown in dashed lines in FIG. 7e) of the 1DOF cross-pivot flexure, providing axial stiffness without altering the hinge flexure system 3040 footprint. The truss system shown in FIG. 7e is compatible with 3DOF cross-pivot flexure designs which use cruciform or cage approach hinge vertical blade approaches for the z DOF, as the truss may be linked to the side of these vertical blades without significantly altering their elastomechanics.

The x- and y-axis heads 3040c1 and 3040c2 shown for the flexure system 3040 should be designed as with a curved profile, thickest at the middle as shown in FIG. 7e. This ensures the heads 3040c1/3040c2 are stiff against the axial loading while also making full use of the gaps necessary to enable the heads to traverse the full range of motion.

Force and Strain Stiffness

Summary

This section is included to help explain why the cross-pivot flexure bearing systems described herein provide especially high performance in the metrics of range per size, as well as off-axis loading capability per range. The high performance benefit is accrued because flexure cross pivots with flexures intersecting at their midpoint have the unique property of applying a uniform moment over the whole blade. The uniform loading on the beam generates the maximum possible blade distortion for a given peak material stress and thus maximizes range per size. This same benefit means that mid-point intersecting cross-pivot bearings have the lowest possible aspect ratio of length per bending thickness for a given range, and thus have the highest possible buckling load per range.

Details

It is often useful to be able to shift the instant center out of the middle of a cross-pivot flexure system such as any one of flexure systems 3000-3040, and potentially beyond the bounds of the flexure systems themselves, to work around geometric limitations when synthesizing complex structures. It is important to be able to quickly understand the tradeoffs in range and stiffness associated modification of the instant center location. Standard Euler linear analysis was used to extract simple design expressions to predict approximate stiffness and strain buildup, which are defined by the non-dimensional instant center location $r_{ic}$, shown in Eq. (1), that is zeroed at the midpoint of the flexure system. The analysis focuses on a single flexure blade subjected to rotation around the instant center. The cross-pivot flexure system may be composed of multiple such blades, each approaching the instant center from a different angle. This approach is generalizable to any set of blades comprising a cross-pivot flexure, including sets with variable geometry and instant center offset such as discussed above with FIGS. 7c and 7d. The analysis of the single blade is laid out as in FIGS. 8a and 8b, where the blade 4000 with length L, Young's Modulus E, and second moment of area I, is grounded at one end 4002 and loaded by force $F_x$ and moment $M_y$ to rotate around an instant center via translation x and rotation y at the other end. Moment $M_{ic}$ and rotation $\theta_{ic}$ around the instant center are offset from the end of the blade 4000 by $h_{ic}$, which is defined positive away from the flexure system.

The compliance matrix, C, for the blade 4000 can be used to link displacements and loads as shown in Eq. (1), while transform $T_{ic}$ shifts these displacements and loads to the instant center.

$$\begin{bmatrix} \delta_x \\ \theta_y \end{bmatrix} = C \begin{bmatrix} F_x \\ M_y \end{bmatrix}, \begin{bmatrix} \delta_x \\ \theta_y \end{bmatrix} = T_{ic}\theta_{ic}, M_{ic} = T_{ic}^T \begin{bmatrix} F_x \\ M_y \end{bmatrix} \quad \text{(Eq. 1)}$$

$$\text{where } C = \begin{bmatrix} \dfrac{L}{3EI} & \dfrac{L^2}{2EI} \\ \dfrac{L^2}{2EI} & \dfrac{L}{EI} \end{bmatrix}, T_{ic} = \begin{bmatrix} -h_{ic} \\ 1 \end{bmatrix}, r_{ic} = \dfrac{h_{ic}}{L} + \dfrac{1}{2}$$

The rotation around the instant center can be linked to the applied moment via the terms in Eq. (1) as shown in Eq. (2), from which the cross-pivot flexure rotational stiffness, $k_{cp}$, can be extracted.

$$\dfrac{k_{cp}}{T_{ic}^T C^{-1} T_{ic}\theta_{ic}} \quad \text{(Eq. 2)}$$

This stiffness can be split into three terms as shown in Eq. (3), a stiffness scaling factor $y_k$ and the intrinsic rotation-to-moment stiffness $k_{m\theta}$. The stiffness scaling factor provides a convenient term to capture the effect of varying the instant center location. The natural normalization around the midpoint of the blade 4000 leaves the expression easily interpretable, showing the minimum stiffness is found at $r_{ic}=0$ and rises steeply by the square of the shift in either direction. The total cross-pivot flexure system stiffness is the sum of the $k_{cp}$ contribution from each blade.

$$k_{cp} = \gamma_k(r_{ic})k_{m\theta} \quad \text{(Eq. 3)}$$

$$\text{where } \gamma_k(r_{ic}) = 1 = 12r_{ic}^2, k_{m\theta} = \dfrac{EI}{L}$$

The terms in Eq. (1) can be rearranged to calculate the applied force and moment on the end of the blade as shown in Eq. (4), which can be used to study the applied moment throughout the blade, $M_b$, where x is the distance from the base of the blade, $r_x$ is the normalized form of x, and $y_{km}$ is the moment scaling factor.

$$\begin{bmatrix} F_x \\ M_y \end{bmatrix} = C^{-1}T_{ic}\theta_{ic} \quad \text{(Eq. 4)}$$

$$M_b = M_y + F_x(L - x) = \gamma_m(r_{x,rk})k_{m\theta}\theta_{ic}$$

$$\text{where } \gamma_m(r_x r_{ic} = 1 + (2r_x - 1)6r_{ic}, r_x = x/L$$

The peak moment is found at either end of the blade 4000, so extraction of the maximum moment, $M_{bMax}$, requires comparison of the two end values, as captured in $y_{kmMax}$, the maximum moment scaling factor. The peak moment expressions are symmetric around the blade 4000 midpoint which is the crossover point between the two expressions. It turns out to be possible to capture the net maximum value with a simple expression based on $r_{ic}$. The moment output is minimum at $r_{ic}=0$ and rises steeply in either direction as the instant center is shifted.

$$M_{bMax} = \gamma_{mMax}(r_{ic})k_{m\theta}\theta_{ic}$$

$$\gamma\gamma_{mMax}(r_{ic}) = \max(|\gamma_{mMax}(0,r_{ic})|, |\gamma_{mMax}(1,r_{ic})|) = 1 + 6|r_{ic}| \quad \text{(Eq. 5)}$$

The maximum moment can now be mapped to strain $\varepsilon$ via Eq. (6), which includes a second order correction factor, $y_2$, to account for stress concentrators or other geometry. The strain stiffness, $k_{\varepsilon\theta}$, captures the ratio of strain buildup versus rotation around the instant center.

$$\varepsilon = K_{s\theta}\theta_{ic} = \dfrac{M_{bMax}\frac{h}{2}}{EI}\gamma_2 \quad \text{(Eq. 6)}$$

The strain stiffness term can be extracted as shown in Eq. (7), and rearranged to show the contributing elements which include the maximum moment scaling factor, the inverse of the blade aspect ratio L/h and the second order correction factor. The strain stiffness expression provides the designer with a means to in map from structural kinematics to cross-pivot flexure geometric parameters (instant center location, aspect ratio, fillet size).

$$k_{\varepsilon\theta} = \dfrac{1}{2}\gamma_{mMax}(r_{ic})\dfrac{h}{L}\gamma_2 \quad \text{(Eq. 7)}$$

Minimal strain stiffness occurs when the moment scaling factor reaches 1 with the instant center at the midpoint of the blade 4000. Any other location will incur a stiffness penalty that results in the need for higher blade aspect ratios or reduced range. The aspect ratio drives several other secondary metrics including manufacturing complexity, DOC stiffness and buckling. Single DOF cross-pivot flexure designs with $r_{ic}=0$ provide the theoretical minimum aspect ratio required to achieve a desired range and thus provide the best possible DOC stiffness and load capacity for a given range. These benefits (both static and dynamic) can be passed to non-rotary flexure bearings by synthesizing kinematic equivalents out of cross-pivot flexures.

Microscale Applications

The multi-DOF cross pivot bearing is ideal for microscale structures where monolithic flexures are the dominant bearing type due to the lack of assembly requirement. MEMS systems often struggle with the tradeoff of device range versus dynamics, where increasing the range of the bearing typically results in the degree of constraint stiffnesses and buckling loads being lowered, thus lowering the frequency of the structural dynamics. Dynamic performance is a key concern for MEMS since they are generally designed to make use of the high actuation forces and low masses that can be achieved at the microscale. A flexural bearing which results in structural resonances below the operating frequency of the device can be an unacceptable issue for the design. The multi-DOF cross-pivot bearing provides a building block for creating cross-pivot synthesized kinematic equivalents to standard MEMS flexural bearings. The cross-pivot synthesized kinematic equivalent bearing can provide the desired increased range of motion without the drawback of the typical significant reduction in structural resonances or buckling load, thus significantly expanding the performance envelope for the MEMS device.

Fabrication and Mass Distribution

Multi-DOF cross-pivot bearings such as formed by the flexure systems described herein are complex 3d structures which are best fabricated using emerging additive and micro-additive manufacturing techniques. While these designs may have been completely infeasible on the microscale several decades ago, they are increasingly feasible as micro-additive manufacturing techniques have rapidly expanded in the past few years. In particular, the Multi-DOF cross-pivot flexure bearing can be created by two-photon polymerization or other true-3d printing approaches that can create a smoothly sloped blade. The structure can be fabricated in the positive form where the cured resist creates the flexure material, or the flexure material could be coated onto the printed structure via a process like atomic layer deposition to create a thin shell flexure geometry. The original printed polymer may be removed to create a hollow structure or retained to keep the structure more rigid.

REFERENCES

The present disclosure is expected to find utility in a wide range of diverse applications including, but not limited to, microelectromechanical systems (MEMS) that are able to incorporate larger range motion devices like micromirrors and switches; aerospace applications that make use of improved range and/or sizes for precision optics; improved launch survivability; improved stability on high-g platforms; even better precision during operation; more stable alignment for critical elements like optics; and transportable/deployable high precision optics/sensors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cross-pivot flexure system comprising:

an elongated, column-like center post element having a center post, a first head directly coupled to a first end of the center post, and the first head extending laterally of the first end of the center post;

the center post including a second head at a second end of the center post, the second head directly coupled to the second end of the center post and projecting laterally, non-parallel, to the first head, and the first and second ends of the center post being at opposing longitudinal ends of the center post;

a first cross-pivot element connected only to the first head at a first end thereof, and free from the center post at a second end thereof;

a second cross-pivot element connected only to the second head at a first end thereof, and free from the center post at a second end thereof;

the first head arranged along a first longitudinal axis;

the second head arranged along a second longitudinal axis;

the first head attached to a support element, wherein the support element is independent of the center post, through the second end of the first cross-pivot element for enabling rotational movement of the center post about the first longitudinal axis;

the first cross-pivot element comprising an inmost planar surface having a first plane, the center post comprising an outer planar surface facing the inmost planar surface and having a second plane, the first and second planes further extending at an angle non-parallel to one another so as to diverge away from the first head, and the second plane extending at an angle parallel to the longitudinal axis of the center post; and the second head further attached to a motion stage flexure, independent of the center post element, via the second end of the second cross-pivot element, permitting rotational movement of the second head about the second longitudinal axis.

2. The system of claim 1, wherein the first and second longitudinal axes intersect one another.

3. The system of claim 1, wherein the first and second longitudinal axes are arranged at a right angle to one another.

4. The system of claim 1, further comprising a plurality of the first cross-pivot elements which couple the first head to the support element, and wherein the plurality of first cross-pivot elements have midpoints thereof which intersect the first longitudinal axis.

5. The system of claim 4, wherein at least one of the plurality of first cross pivot elements is non-linear.

6. The system of claim 4, wherein at least one of the plurality of first cross-pivot elements is arranged non-parallel to another one of the plurality of first cross-pivot elements.

7. The system of claim 1, further comprising a plurality of second cross-pivot elements which couple the second head to the motion stage flexure, and where the plurality of second cross-pivot elements have midpoints thereof which intersect the second longitudinal axis.

8. The system of claim 1, wherein the center post is arranged to extend parallel along a third longitudinal axis.

9. The system of claim 8, wherein the third longitudinal axis is arranged perpendicular to each of the first and second longitudinal axes.

10. The system of claim 9, wherein the first, second and third longitudinal axes are arranged to intersect at a common point to provide equal symmetry of movement of the first and second heads about the first and second longitudinal axes, respectively.

11. The system of claim 1, further comprising a pair of first cross-pivot elements, with ones of the pair of first cross-pivot elements being arranged on opposing sides of the center post and having midpoints thereof passing through the first longitudinal axis.

12. The system of claim 11, further comprising an additional pair of first cross-pivot elements, the pair of first cross-pivot elements and the additional pair of first cross-pivot elements being arranged such that at least two ones of the first cross-pivot elements are arranged on opposing sides of the center post, and all are aligned such that a midpoint of each is aligned with the first longitudinal axis.

13. The system of claim 1, further comprising a pair of second cross-pivot elements, with ones of the pair of second cross-pivot elements arranged on opposing sides of the center post and having midpoints thereof passing through the second longitudinal axis.

14. The system of claim 13, further comprising an additional pair of second cross-pivot elements, the pair of second cross-pivot elements and the additional pair of second cross-pivot elements being arranged such that at least two ones of the second cross-pivot elements are arranged on opposing sides of the center post, and all are aligned such that a midpoint of each is aligned with the second longitudinal axis.

15. A method for forming a cross-pivot flexure system, the method comprising:

coupling a first end of a first cross-pivot flexure blade directly to a first head at a first longitudinal end of an elongated, column-like center post element having a center post, the first head extending laterally of the center post and being connected directly to the first cross-pivot flexure blade, a second end of the first cross-pivot flexure blade being free from the center post;

coupling a second end of the first cross-pivot flexure blade directly to a support component, the support component being independent of the center post element, and further such that a first rotational axis extends through the first cross-pivot flexure blade parallel to a longitudinal axis of the first head;

coupling a first end of a second cross-pivot flexure blade directly to a second head at an opposite second longitudinal end of the center post, the second cross-pivot flexure having a second end which is free of the center post, and the second end of the second cross-pivot flexure blade being connected directly to a movable stage element, independent of the center post element, and spaced apart from the first head and independent of the first head, such that a second rotational axis extends through the second cross-pivot flexure blade parallel to a longitudinal axis of the second head;

the first cross-pivot element comprising an inmost planar surface having a first plane, the center post comprising an outer planar surface facing the inmost planar surface and having a second plane, the first and second planes further extending at an angle non-parallel to one another so as to diverge away from the first head, and the second plane extending at an angle parallel to the longitudinal axis of the center post; and further orienting the second longitudinal axis non-parallel to the first rotational axis.

16. The method of claim 15, further comprising at least one of:

orienting the first and second rotational axes such that they intersect one another; or orienting the second rotational axis perpendicular to the first rotational axis.

17. The method of claim 15, further comprising using an additional first cross-pivot flexure blade coupled between the first head and the support component, such that the additional first cross-pivot flexure blade extends through the first rotational axis.

18. The method of claim 15, further comprising using an additional second cross-pivot flexure blade coupled between the second head and the movable stage element, such that the additional second cross-pivot flexure blade extends through the second rotational axis.

\* \* \* \* \*